(12) United States Patent
Shimamoto et al.

(10) Patent No.: US 11,892,149 B2
(45) Date of Patent: Feb. 6, 2024

(54) SUPPORT ELEMENTS FOR LIGHTING FIXTURES OR ENTERTAINMENT EQUIPMENT

(71) Applicants: VOLT LITES, INC., Burbank, CA (US); SOLID INDUSTRIES, LLC, Burbank, CA (US)

(72) Inventors: Matthew Shimamoto, Burbank, CA (US); Aaron Cook, Burbank, CA (US)

(73) Assignees: VOLT LITES, INC., Burbank, CA (US); SOLID INDUSTRIES, LLC, Burbank, CA (US)

( * ) Notice: Subject to any disclaimer, the term of this patent is extended or adjusted under 35 U.S.C. 154(b) by 275 days.

(21) Appl. No.: 17/452,487

(22) Filed: Oct. 27, 2021

(65) Prior Publication Data

US 2023/0129703 A1 Apr. 27, 2023

(51) Int. Cl.
| | | |
|---|---|---|
| *F21V 21/14* | (2006.01) | |
| *F16M 13/02* | (2006.01) | |
| *F16C 11/04* | (2006.01) | |
| *F21W 131/406* | (2006.01) | |

(52) U.S. Cl.
CPC .............. *F21V 21/14* (2013.01); *F16C 11/04* (2013.01); *F16M 13/022* (2013.01); *F21W 2131/406* (2013.01)

(58) Field of Classification Search
CPC ........ F21V 21/14; F16C 11/04; F16M 13/022
USPC .............................. 248/226.11, 343; 362/382
See application file for complete search history.

(56) References Cited

U.S. PATENT DOCUMENTS

| | | | | |
|---|---|---|---|---|
| D623,348 S | * | 9/2010 | Tsai | D26/140 |
| D623,349 S | * | 9/2010 | Tsai | D26/140 |
| 10,619,643 B2 | * | 4/2020 | Tang | F04D 25/088 |
| 11,193,657 B2 | * | 12/2021 | Weston | F21V 11/08 |
| 2011/0121151 A1 | * | 5/2011 | Stifal | F16M 13/027 248/343 |

* cited by examiner

*Primary Examiner* — Todd M Epps
(74) *Attorney, Agent, or Firm* — INNOVATION CAPITAL LAW GROUP, LLP; Vic Lin

(57) ABSTRACT

An equipment support assembly includes a base member that can connect to conventional clamps. The clamps may attach to conventional support structure of a building, such as an entertainment venue. Two substantially parallel pivot member adjustment plates can extend from a bottom side of the base member. A pivot member can pivotably move between the two pivot member adjustment plates, where one or more bolts inserted through the pivot member adjustment plates and the pivot member can fix the pivot member at a desired angle relative to the base member. An equipment support can be attached at the bottom of the pivot member for attachment of the desired equipment, such as lighting fixtures. Accordingly, the lighting fixtures can be hung at a desired angle through adjustment of the equipment support assembly.

20 Claims, 4 Drawing Sheets

SUPPORT ELEMENTS FOR LIGHTING FIXTURES OR ENTERTAINMENT EQUIPMENT

BACKGROUND OF THE INVENTION

1. Field of the Invention

Embodiments of the invention relate generally to lighting and entertainment equipment supports. More particularly, embodiments of the invention relate to a mount for pivotably support lighting fixtures.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Lighting for theaters, concert venues, or the like an be positioned at various locations, relative to the stage. Front of house lighting may be hung from battens or trusses above the audience. Electrics may be hung from battens or trusses above the stage itself. Torm lighting, also known as juliets or tormentors, are usually formed from a series of pipes downstage left and downstage right, typically between the transitions between stage and audience. Lighting is often hung above performers or an audience, thus, there is a need to ensure proper design strength and secure attachment of such lighting systems.

In view of the foregoing, there is a need for improved lighting and/or entertainment equipment support system that addresses these and other shortcomings of conventional supports.

SUMMARY OF THE INVENTION

Embodiments of the present invention provide a fixture support assembly comprising a base plate configured to attach to a support bar; first and second adjustment plates extending from a bottom side of the base plate; at least one elongated slot formed in the first and second adjustment plates; a pivot member pivotably rotatable about an axis, the pivot member disposed between the first and second adjustment plates; at least one mounting opening formed in the pivot member, wherein both the at least one mounting opening and the at least one slot is a first distance from the axis such that the at least mounting opening aligns with the at least one slot as the pivot member is pivotably moved between the first and second adjustment plates; and an equipment support attached to a bottom side of the pivot member, the equipment support configured to attach to a fixture.

Embodiments of the present invention further provide a fixture support assembly comprising a base plate configured to attach to a support bar; first and second adjustment plates extending from a bottom side of the base plate; a pivot member pivotably rotatable about an axis, the pivot member disposed between the first and second adjustment plates, the pivot member having a bottom edge extending beyond a bottom edge of the first and second adjustment plates, the axis extending through the pivot member and the first and second adjustment plates; a first row of elongated slots formed in the first and second adjustment plates at a first distance from the axis; a second row of elongated slots formed in the first and second adjustment plates at a second distance from the axis; a first set of mounting openings formed in the pivot member at the first distance from the axis; a second set of mounting openings formed in the pivot member at the second distance from the axis; and an equipment support attached to a bottom side of the pivot member, the equipment support configured to attach to a fixture.

In some embodiments, the first and second adjustment plates extend substantially parallel to each other from the base plate.

In some embodiments, the first and second adjustment plates have a flat side and an opposite side formed in an arc shape. In some embodiments, the flat side of the first and second adjustment plates fits into slots cut into the bottom surface of the base plate. In some embodiments, the arc shape is a semi-circular shape and the axis is located at a center point of an imaginary circle formed by extending the semi-circular shape into the imaginary circle.

Embodiments of the present invention also provide a method for attaching a fixture to a support bar comprising attaching a base plate to the support bar, the base plate having first and second adjustment plates extending from a bottom side thereof; disposing a pivot member between the first and second adjustment plates, the pivot member pivotably rotatable about an axis, the axis disposed through the first and second adjustment plates and the pivot member; extending a bolt through at least one elongated slot formed in the first and second adjustment plates and at least one mounting opening formed in the pivot member, wherein both the at least one mounting opening and the at least one slot is a first distance from the axis such that the at least mounting opening aligns with the at least one slot as the pivot member is pivotably moved between the first and second adjustment plates; and attaching the fixture to an equipment support attached to a bottom side of the pivot member.

These and other features, aspects and advantages of the present invention will become better understood with reference to the following drawings, description, and claims.

BRIEF DESCRIPTION OF THE DRAWINGS

Some embodiments of the present invention are illustrated as an example and are not limited by the figures of the accompanying drawings, in which like references may indicate similar elements.

Figure 1:
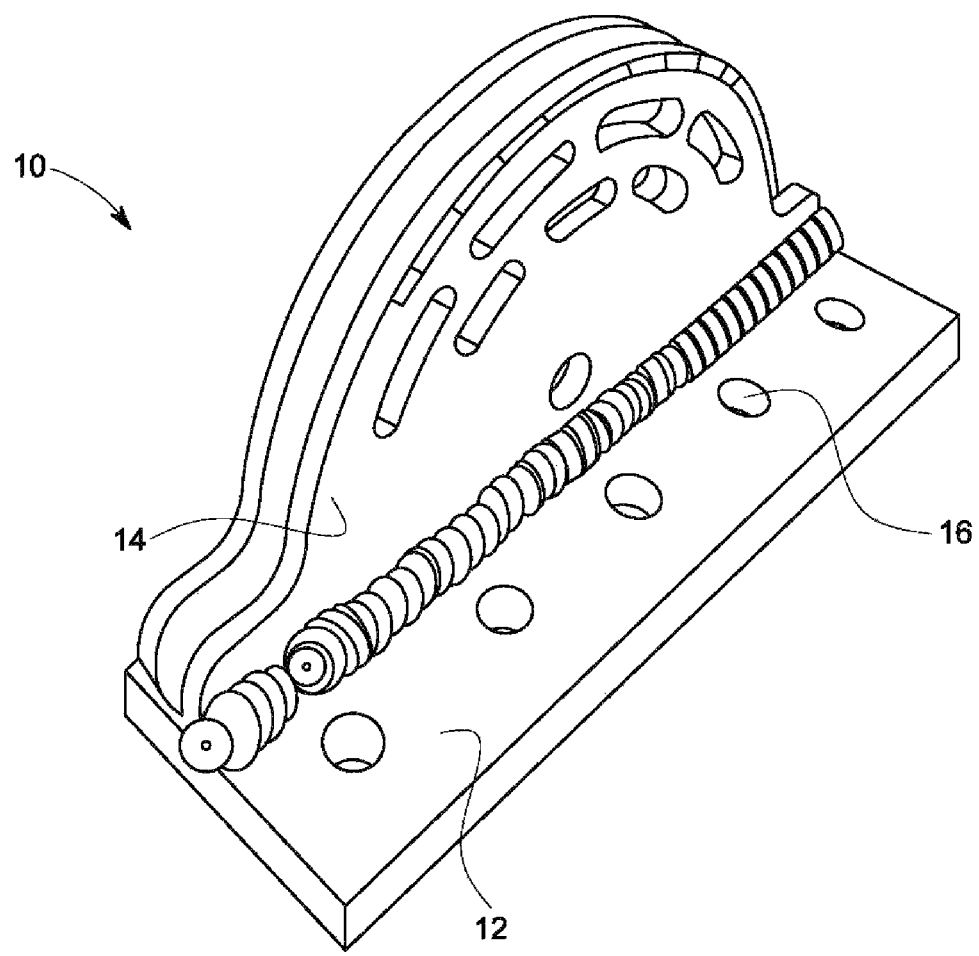
FIG. 1 illustrates a perspective view of a support bracket according to an exemplary embodiment of the present invention.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any device, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide an equipment support assembly that includes a base member that can connect to conventional clamps. The clamps may attach to conventional support structure of a building, such as an entertainment venue. Two substantially parallel pivot member adjustment plates can extend from a bottom side of the base member. A pivot member can pivotably move between the two pivot member adjustment plates, where one or more bolts inserted through the pivot member adjustment plates and the pivot member can fix the pivot member at a desired angle relative to the base member. An equipment support can be attached at the bottom of the pivot member for attachment of the desired equipment, such as lighting fixtures. Accordingly, the lighting fixtures can be hung at a desired angle through adjustment of the equipment support assembly.

Referring now to FIG. 1, a support bracket 10 is shown. The support bracket 10 includes a base member 12 having two pivot member adjustment plates 12 (also referred to as adjustment plates 12) extending from a bottom side thereof. The two adjustment plates 12 may be substantially parallel with each other, where substantially parallel refers to an orientation where a pivot member can pivot between the two adjustment plates 12 about an axis extending through the two adjustment plates 12, as described in greater detail below.

Figure 2:
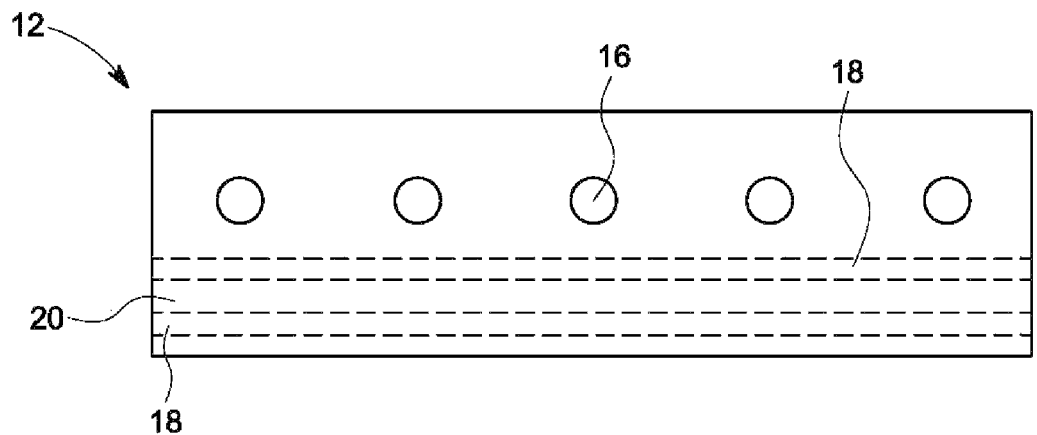
FIG. 2 illustrates a bottom view of a base member of the support bracket of FIG. 1.
Figure 3:
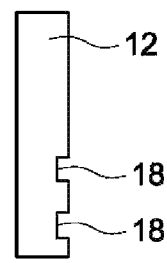
FIG. 3 illustrates an end view of the base member of FIG. 2.
Figure 4:
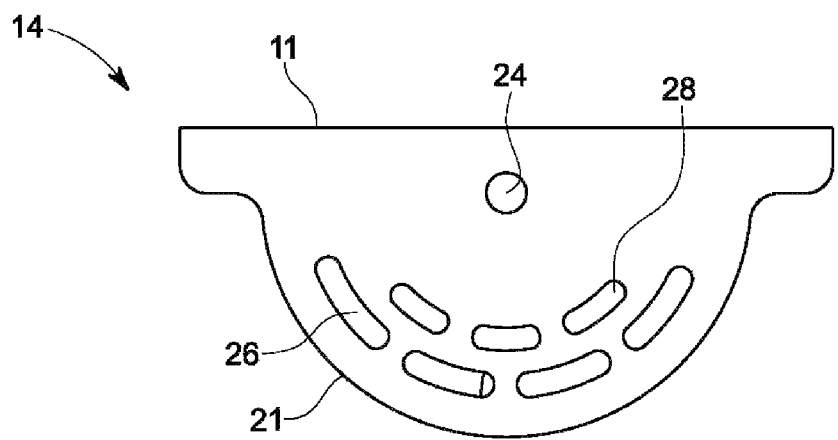
FIG. 4 illustrates a pivot member adjustment plate of the support bracket of FIG. 1.

Referring also to FIGS. 2 through 4, the base member 12 can include a plurality of holes 16 extending therethrough. The holes 16 can be designed to attach one or more conventional clamp members 50 (see FIGS. 8 and 9) thereto.

The adjustment plates 14 can include a flat base 11 for attachment to the base member 12. In some embodiments, the base member 12 can include two channels 18 formed therein for insertion of the flat base of the adjustment plates 14. In some embodiments, the adjustment plates 14 can be welded to the base member 12, as shown in FIG. 1. Of course, other attachment methods, as may be known in the art, may be used for connecting the adjustment plates 14 to the base member 12. A space 20 may be disposed between the channels 18. In some embodiments, a width of the channels 18 corresponds to a width of the adjustment plates 14, where the width of the space 20 may correspond to a distance between the two adjustment plates 14.

The adjustment plates 14 may be formed in a semi-circular arc 21 on a surface opposite the flat base. The adjustment plates 14 may include a pivot opening 24 formed therethrough. The pivot opening 24 may be disposed at a center of a circle formed by continuing the semi-circular arc 21. The adjustment plates 14 may further include one or more rows of slots 26, 28. In some embodiments, two rows of slots—an inner row of slots 28 and an outer row of slots 26—may be formed in the adjustment plates 14. The slots 26, 28 may be elongated and formed in an arc similar to an arc of the semi-circular art 21 on the outside of the adjustment plates 14.

Figure 5:
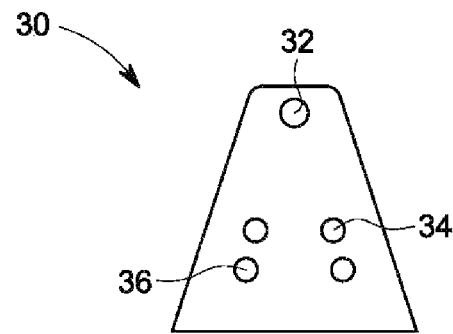
FIG. 5 illustrates a pivot member fitting between the pivot member adjustment plates of the support bracket of FIG. 1.

Referring now to FIG. 5, the pivot member 30 is shown. The pivot member 30 can include a pivot opening 32 and a plurality of mounting openings 34, 36. The mounting openings 34, 36 may be formed in two rows—an inner row of mounting openings 34 and an outer row of mounting openings 36. The inner row of mounting openings 34 may be a first distance away from the pivot opening 32. The outer row of mounting openings 36 may be a second distance away from the pivot opening 32. The first distance can correspond to a distance that the inner row of slots 28 is from the pivot opening 24 of the adjustment plates 14. The second distance can correspond to a distance that the outer row of slots 26 is from the pivoting 24 of the adjustment plates 14. Thus, when a pivot pin 51 (see FIG. 9) is inserted into the aligned pivot openings 24, 32 of the adjustment plates 14 and the pivot member 30, respectively, the pivot member 30 can pivot on the axis defined by the pivot pin 51 and the mounting openings 34, 36 can align with the rows of slots 26, 28. One or more bolts 41 can be inserted through the slots 26, 28 and the mounting openings 24, 26 to fix the pivot member 30 at a desired angle relative to the base member 12. Typically, at least two blots 41 are used to secure the pivot member 30 at the desired angle.

Figure 6:
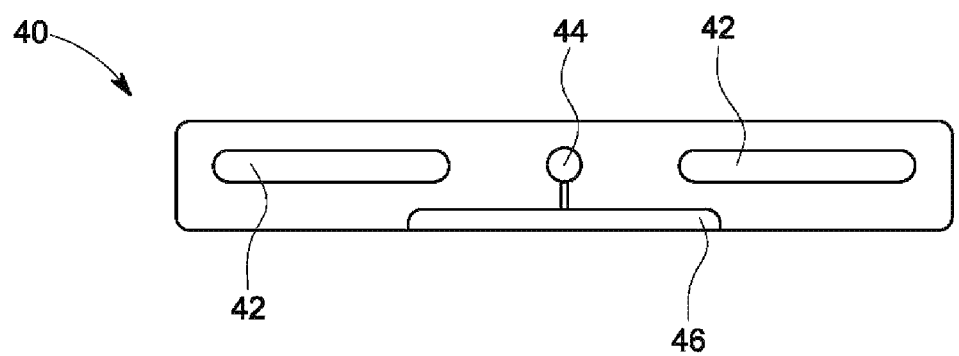
FIG. 6 illustrates a bottom view of an equipment support attachable to the pivot member of FIG. 5.
Figure 7:
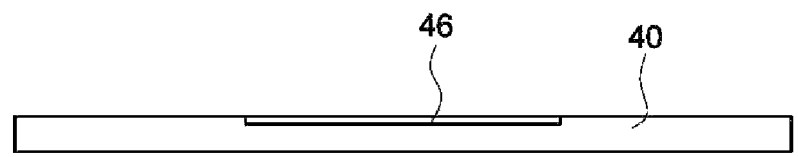
FIG. 7 illustrates a side view of the equipment support of FIG. 6.

Referring now to FIGS. 6 and 7, an equipment support 40 can include mounting slots 42 and/or mounting holes 44 formed therein. The mounting slots 42 and the mounting holes 44 may be formed to permit mounting of a fixture 60 (see FIG. 9) thereto. The fixture 60 may be, for example, a lighting fixture for an entertainment venue, such as a theater or concert.

Figure 8:
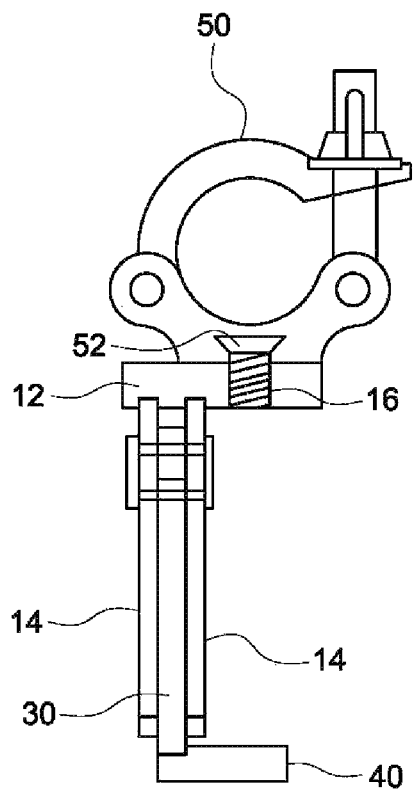
FIG. 8 illustrates an end view of a support assembly, including first and second support brackets of FIG. 1, the base member of FIG. 2, the pivot member of FIG. 5 pivotably supported between the first and second support brackets, the equipment support of FIG. 6, with a clamp assembly for attaching the support assembly onto a rod.
Figure 9:
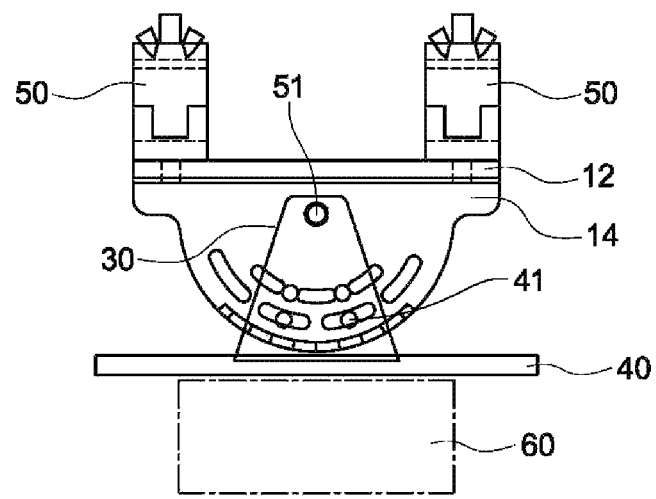
FIG. 9 illustrates a front view of the support assembly of FIG. 8, including a fixture attached to the equipment support.

In some embodiments, a recess 46 can be formed in a top surface of the equipment support 40. The recess 46 may be sized to receive a bottom edge of the pivot member 30 therein (as shown in FIGS. 8 and 9, for example). The pivot member 30 may be welded into the recess 46 of the equipment support 40. Of course, other attachment means may be used to join the equipment support 40 with the pivot member 30.

FIGS. 8 and 9 illustrate an entire assembly with the fixture 60 attached in FIG. 9. The clamps 50 may be conventional clamps that are sized to clamp onto tubular members already present in the lighting rigging. The clamps 50 may attached to the base member 12 via screws of bolts 52 that fit into the openings 16 of the base member 12. In some embodiments, the axis of the lighting rigging may be orthogonal to the axis of the pivot pin 51. Thus, the fixtures 60 may be adjusted angularly with respect to the axis of the lighting rigging by adjusting the clamps 50. The fixtures 60 may further be adjusted angularly by moving the pivot member 30 relative to the base member 12 of the support bracket 10.

The assembly of the present invention can be made from various materials as may be known in the art. For example, the base member 12 and the adjustment plates 14 may be formed from aluminum. The pivot member 30 and the equipment support 40 may be formed from steel, for example. The welding connection may be performed by a complete joint penetration (CJP) welding process, for example. Of course, other materials and connection methods may be employed in various embodiments of the present invention.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a sub combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A fixture support assembly comprising:
    a base plate configured to attach to a support bar;
    first and second adjustment plates extending from a bottom side of the base plate;
    at least one elongated slot formed in the first and second adjustment plates;
    a pivot member pivotably rotatable about an axis, the pivot member disposed between the first and second adjustment plates;
    at least one mounting opening formed in the pivot member, wherein both the at least one mounting opening and the at least one slot are a first distance from the axis such that the at least mounting opening aligns with the at least one slot as the pivot member is pivotably moved between the first and second adjustment plates; and
    an equipment support attached to a bottom side of the pivot member, the equipment support configured to attach to a fixture.

2. The fixture support assembly of claim 1, wherein the first and second adjustment plates extend substantially parallel to each other from the base plate.

3. The fixture support assembly of claim 1, wherein the first and second adjustment plates have a flat portion fitting into slots cut into the bottom surface of the base plate.

4. The fixture support assembly of claim 1, wherein the first and second adjustment plates have a flat side and an opposite side formed in an arc shape.

5. The fixture support assembly of claim 4, wherein the arc shape is a semi-circular shape and the axis is located at a center point of an imaginary circle formed by extending the semi-circular shape into the imaginary circle.

6. The fixture support assembly of claim 1, wherein the at least one elongated slot includes a first plurality of elongated slots, formed the first distance from the axis, and a second plurality of elongated slots, formed a second distance from the axis.

7. The fixture support assembly of claim 6, wherein the at least one mounting opening includes a first set of at least two mounting openings formed the first distance from the axis, and a second set of at least two mounting openings formed the second distance from the axis.

8. The fixture support assembly of claim 1, further comprising a slot formed in the equipment support, the slot fitting a flat bottom side of the pivot member therein.

9. The fixture support assembly of claim 1, wherein the base plate includes one or more holes for attaching one or more clamps thereto, the one or more clamps attaching to the support bar.

10. The fixture support assembly of claim 1, wherein the equipment support includes one or more mounting slots and/or mounting holes for attaching the fixture thereto.

11. A fixture support assembly comprising:
a base plate configured to attach to a support bar;
first and second adjustment plates extending from a bottom side of the base plate;
a pivot member pivotably rotatable about an axis, the pivot member disposed between the first and second adjustment plates, the pivot member having a bottom edge extending beyond a bottom edge of the first and second adjustment plates, the axis extending through the pivot member and the first and second adjustment plates;
a first row of elongated slots formed in the first and second adjustment plates at a first distance from the axis;
a second row of elongated slots formed in the first and second adjustment plates at a second distance from the axis;
a first set of mounting openings formed in the pivot member at the first distance from the axis;
a second set of mounting openings formed in the pivot member at the second distance from the axis; and
an equipment support attached to a bottom side of the pivot member, the equipment support configured to attach to a fixture.

12. The fixture support assembly of claim 11, wherein the first and second adjustment plates extend substantially parallel to each other from the base plate.

13. The fixture support assembly of claim 11, wherein the first and second adjustment plates have a flat side and an opposite side formed in an arc shape.

14. The fixture support assembly of claim 13, wherein the flat side of the first and second adjustment plates fits into slots cut into the bottom surface of the base plate.

15. The fixture support assembly of claim 13, wherein the arc shape is a semi-circular shape and the axis is located at a center point of an imaginary circle formed by extending the semi-circular shape into the imaginary circle.

16. A method for attaching a fixture to a support bar, comprising:
attaching a base plate to the support bar, the base plate having first and second adjustment plates extending from a bottom side thereof;
disposing a pivot member between the first and second adjustment plates, the pivot member pivotably rotatable about an axis, the axis disposed through the first and second adjustment plates and the pivot member;
extending a bolt through at least one elongated slot formed in the first and second adjustment plates and at least one mounting opening formed in the pivot member, wherein both the at least one mounting opening and the at least one slot is a first distance from the axis such that the at least mounting opening aligns with the at least one slot as the pivot member is pivotably moved between the first and second adjustment plates;
tightening the bolt to fix an angle of the pivot member relative the first and second adjustment plates; and
attaching the fixture to an equipment support attached to a bottom side of the pivot member.

17. The method of claim 16, wherein the first and second adjustment plates have a flat side and an arc shape opposite the flat side, the flat side fitting into a slot in a bottom side of the base plate.

18. The method of claim 17, wherein the arc shape is a semi-circular shape and the axis is located at a center point of an imaginary circle formed by extending the semi-circular shape into the imaginary circle.

19. The method of claim 16, wherein the at least one elongated slot includes a first plurality of elongated slots, formed the first distance from the axis, and a second plurality of elongated slots, formed a second distance from the axis.

20. The method of claim 19, wherein the at least one mounting opening includes a first set of at least two mounting openings formed the first distance from the axis, and a second set of at least two mounting openings formed the second distance from the axis.

* * * * *